United States Patent
Ogawa

(10) Patent No.: US 11,648,482 B2
(45) Date of Patent: May 16, 2023

(54) MANAGEMENT SYSTEM FOR NETWORK MATCH PUZZLE GAME

(71) Applicant: Tatsunori Ogawa, Tokyo (JP)

(72) Inventor: Tatsunori Ogawa, Tokyo (JP)

( * ) Notice: Subject to any disclaimer, the term of this patent is extended or adjusted under 35 U.S.C. 154(b) by 309 days.

(21) Appl. No.: 16/980,668

(22) PCT Filed: Apr. 24, 2019

(86) PCT No.: PCT/JP2019/017480
§ 371 (c)(1),
(2) Date: Sep. 14, 2020

(87) PCT Pub. No.: WO2020/003724
PCT Pub. Date: Jan. 2, 2020

(65) Prior Publication Data
US 2021/0016186 A1 Jan. 21, 2021

(30) Foreign Application Priority Data
Jun. 28, 2018 (JP) .............................. JP2018-123061

(51) Int. Cl.
A63F 13/80 (2014.01)
A63F 13/327 (2014.01)
(Continued)

(52) U.S. Cl.
CPC ............ *A63F 13/80* (2014.09); *A63F 13/327* (2014.09); *A63F 13/48* (2014.09); *A63F 13/798* (2014.09)

(58) Field of Classification Search
CPC ........ A63F 13/80; A63F 13/327; A63F 13/48; A63F 13/798
See application file for complete search history.

(56) References Cited

U.S. PATENT DOCUMENTS

| | | |
|---|---|---|
| 2004/0198497 A1 | 10/2004 | Yamashita et al. |
| 2004/0198498 A1 | 10/2004 | Yamashita et al. |

(Continued)

FOREIGN PATENT DOCUMENTS

| | | |
|---|---|---|
| JP | 2001-062143 A | 3/2001 |
| JP | 2001-120841 A | 5/2001 |

(Continued)

OTHER PUBLICATIONS

PCT/IB/338, "Notification of Transmittal of Translation of the International Preliminary Report on Patentability for International Application No. PCT/JP2019/017480," dated Jan. 7, 2021.
PCT/IB/373, "International Preliminary Report on Patentability for International Application No. PCT/JP2019/017480," dated Dec. 29, 2020.

(Continued)

*Primary Examiner* — Thomas H Henry
(74) *Attorney, Agent, or Firm* — Manabu Kanesaka

(57) ABSTRACT

In a network match puzzle game, players participate through wireless communication over the Internet. A game management system is provided for a puzzle game in which players alternately put blocks of different shapes in unoccupied space on a game board of a predetermined shape within a predetermined allotted time, and sets competition schedule information including match start times of all matches of a tournament up to a final match, each match start time being calculated by using a game time per match based on a maximum turn number and the allotted time, the maximum turn number being set for each game board or for each shape and/or number of the blocks. The game management system provides the competition schedule information, receives a competition entry request, and sets pairings in the tournament. The game management system establishes a game session and performs game control, and simultaneously starts control of games.

13 Claims, 10 Drawing Sheets

(51) Int. Cl.
    *A63F 13/48*    (2014.01)
    *A63F 13/798*   (2014.01)

(56) References Cited

U.S. PATENT DOCUMENTS

| | | |
|---|---|---|
| 2007/0155488 A1 | 7/2007 | Kubota et al. |
| 2015/0024850 A1 | 1/2015 | Kokami et al. |
| 2016/0101354 A1 | 4/2016 | Yamamura et al. |
| 2017/0316652 A1 | 11/2017 | Siebert et al. |
| 2019/0143217 A1 | 5/2019 | Yoneyama et al. |

FOREIGN PATENT DOCUMENTS

| | | |
|---|---|---|
| JP | 2005-168740 A | 6/2005 |
| JP | 3668427 B2 | 7/2005 |
| JP | 2016-077344 A | 5/2016 |
| JP | 2016-087007 A | 5/2016 |
| JP | 2017-119147 A | 7/2017 |
| JP | 2018-015542 A | 2/2018 |
| KR | 2003-0068526 A | 8/2003 |
| KR | 2014-0115359 A | 9/2014 |

OTHER PUBLICATIONS

PCT/ISA/237, "Written Opinion of the International Searching Authority for International Application No. PCT/JP2019/017480," dated Jul. 2, 2019.
PCT/ISA/210, "International Search Report for International Application No. PCT/JP2019/017480," dated Jul. 2, 2019.
Appliv**** [TETORY], [online], Jun. 12, 2019, published Aug. 28, 2017, URL: https://app-liv.jp/1224634813/ (Appliv Introductory Article: "TETORY").
4gamerfrac****[Enblox], [online], Jun. 12, 2019, published Dec. 4, 2017, URL: https://www.4gamer.net/games/403/G040337/20171204084/ (4Gamer Introductory Article: "Enblox").
Korea Intellectual Property Office, "Office Action for Korean Patent Application 10-2021-7001736," dated Aug. 17, 2022.
Korea Intellectual Property Office, "Office Action for Korean Patent Application 10-2021-7001736," dated Feb. 10, 2023.

FIG. 7
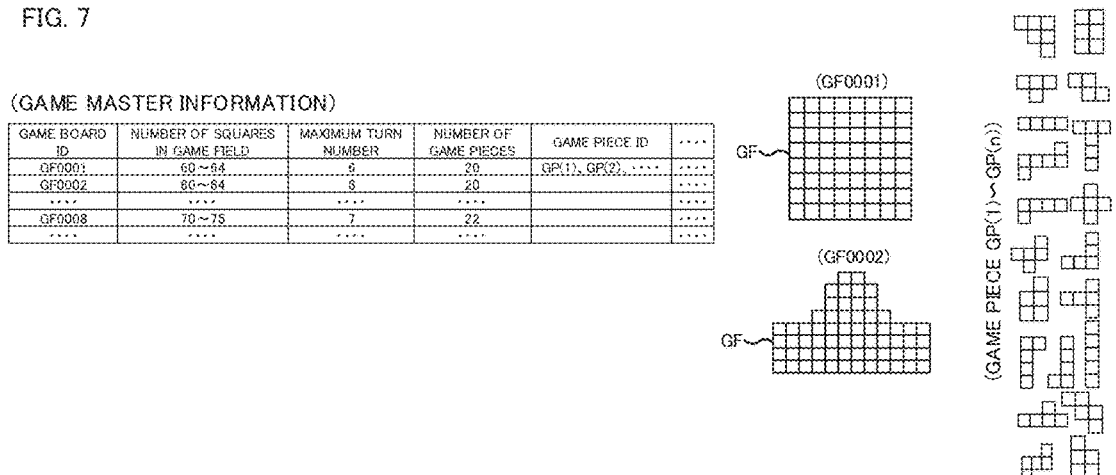
FIG. 8
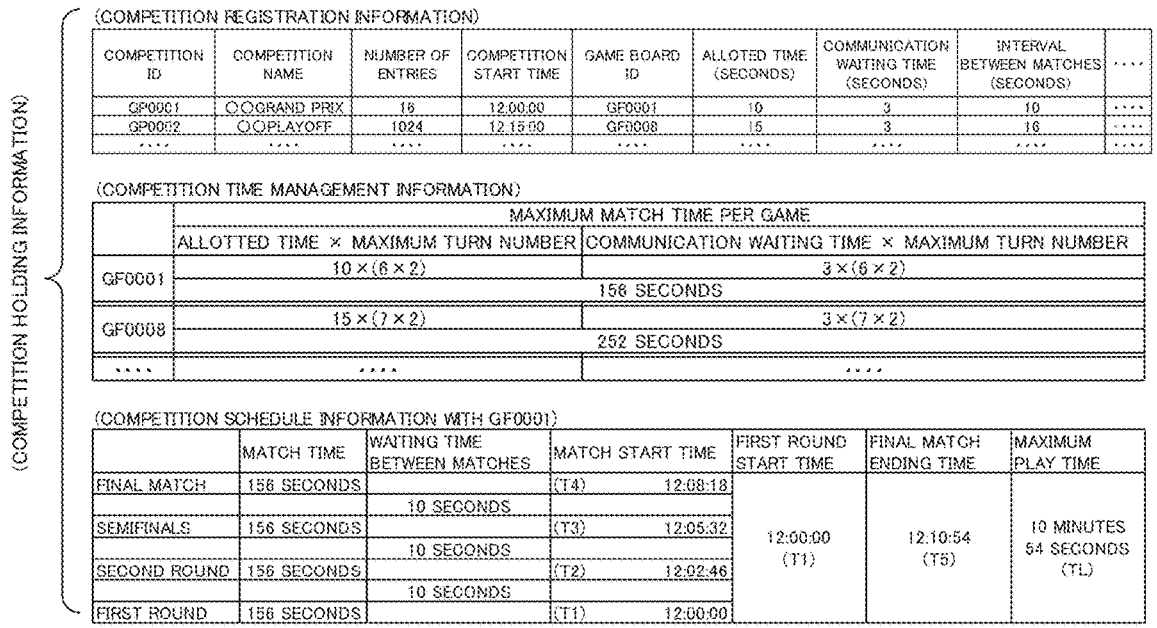
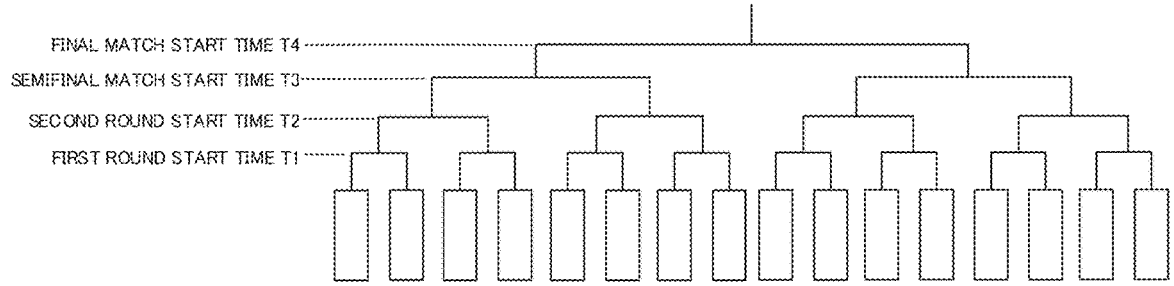

FIG. 9

(COMPETITION SCHEDULE INFORMATION WITH GF0008)

| | MATCH TIME | WAITING TIME BETWEEN MATCHES | MATCH START TIME | FIRST ROUND START TIME | FINAL MATCH ENDING TIME | MAXIMUM PLAY TIME |
|---|---|---|---|---|---|---|
| FINAL MATCH | 252 SECONDS | | 10:39:54 | 10:00:00 | 10:44:06 | 44 MINUTES 6 SECONDS |
| | | 16 SECONDS | | | | |
| SEMIFINALS | 252 SECONDS | | 10:35:28 | | | |
| | | 16 SECONDS | | | | |
| QUARTER FINALS | 252 SECONDS | | 10:31:02 | | | |
| | | 16 SECONDS | | | | |
| ROUND OF 16 | 252 SECONDS | | 10:26:36 | | | |
| | | 16 SECONDS | | | | |
| SIXTH ROUND | 252 SECONDS | | 10:22:10 | | | |
| | | 16 SECONDS | | | | |
| FIFTH ROUND | 252 SECONDS | | 10:17:44 | | | |
| | | 16 SECONDS | | | | |
| FOURTH ROUND | 252 SECONDS | | 10:13:24 | | | |
| | | 16 SECONDS | | | | |
| THIRD ROUND | 252 SECONDS | | 10:08:56 | | | |
| | | 16 SECONDS | | | | |
| SECOND ROUND | 252 SECONDS | | 10:04:28 | | | |
| | | 16 SECONDS | | | | |
| FIRST ROUND | 252 SECONDS | | 10:00:00 | | | |

FIG. 10

(COMPETITION SCHEDULE INFORMATION WITH DIFFERENT GAME BOARDS IN ONE COMPETITION)

| | GAME BOARD | MATCH TIME | WAITING TIME BETWEEN MATCHES | MATCH START TIME | FIRST ROUND START TIME | FINAL MATCH ENDING TIME | MAXIMUM PLAY TIME |
|---|---|---|---|---|---|---|---|
| FINAL MATCH | GF0008 | 252 SECONDS | | 14:30:00 | 14:00:00 | 14:34:12 | 34 MINUTES 12 SECONDS |
| | | | 16 SECONDS | | | | |
| SEMIFINALS | GF0008 | 252 SECONDS | | 14:25:32 | | | |
| | | | 16 SECONDS | | | | |
| QUARTER FINALS | GF0008 | 252 SECONDS | | 14:21:04 | | | |
| | | | 16 SECONDS | | | | |
| ROUND OF 16 | GF0008 | 252 SECONDS | | 14:16:36 | | | |
| | | | 10 SECONDS | | | | |
| SIXTH ROUND | GF0001 | 156 SECONDS | | 14:13:50 | | | |
| | | | 10 SECONDS | | | | |
| FIFTH ROUND | GF0001 | 156 SECONDS | | 14:11:04 | | | |
| | | | 10 SECONDS | | | | |
| FOURTH ROUND | GF0001 | 156 SECONDS | | 14:08:18 | | | |
| | | | 10 SECONDS | | | | |
| THIRD ROUND | GF0001 | 156 SECONDS | | 14:05:32 | | | |
| | | | 10 SECONDS | | | | |
| SECOND ROUND | GF0001 | 156 SECONDS | | 14:02:46 | | | |
| | | | 10 SECONDS | | | | |
| FIRST ROUND | GF0001 | 156 SECONDS | | 14:00:00 | | | |

FIG. 12

(PAIRING SETTING INFORMATION)

| COMPETITION NAME | DATE AND TIME | MATCH ID | MATCH NAME | PLAYER 1 (FIRST MOVER) | PLAYER 2 (SECOND MOVER) |
|---|---|---|---|---|---|
| ○○GRAND PRIX | ・・・・ | S0001 | FINAL MATCH | ・・・・ | ・・・・ |

(GAME LOG)

| MATCH ID | PLAYER | FIRST TURN | SECOND TURN | ・・・・ |
|---|---|---|---|---|
| S0001 | PLAYER 1 (FIRST MOVER) | GAME PIECE GP(5), SQUARE COORDINATE No.(1, 2, 10, 18, 19) | ・・・・ | ・・・・ |
| | PLAYER 2 (SECOND MOVER) | GAME PIECE GP(18), SQUARE COORDINATE No.(9, 17, 25, 26, 33) | ・・・・ | ・・・・ |

(EXAMPLE OF SQUARE COORDINATES ON GAME BOARD)

FIG. 13

(GAME RECORD INFORMATION)

(GAME RECORD OF MATCH)

DATE AND TIME: ・・・・
COMPETITION NAME: ・・・・
PLAYER NAME (FIRST MOVER):
RANKING:
PLAYER NAME (SECOND MOVER)
RANKING

※① TO ⑩ INDICATE ORDER OF GAME PIECES PUT ON GAME BOARD

PREVIOUS MOVE    NEXT MOVE

AUTOMATIC REPRODUCTION (REMAINING GAME PIECES GP)

(EVENT MANAGEMENT INFORMATION)

| EVENT ID | EVENT PROCESSING | TIMING OF EVENT PROCESSING |
|---|---|---|
| I0001 | ADD NEW GAME PIECE | .... |
| I0002 | REMOVE ALREADY DISPLAYED PIECE | .... |
| I0003 | REPLACE ALREADY DISPLAYED PIECE WITH GAME PIECE OF DIFFERENT SHAPE | .... |
| .... | .... | .... |

MANAGEMENT SYSTEM FOR NETWORK MATCH PUZZLE GAME

RELATED APPLICATIONS

The present application is National Phase of International Application No. PCT/JP2019/017480 filed Apr. 24, 2019, and claims priority from Japanese Application No. 2018-123061, filed Jun. 28, 2018, the disclosure of which is hereby incorporated by reference herein in its entirety.

TECHNICAL FIELD

The present invention relates to a network match puzzle game, and more particularly, to techniques for running competitions of games including electronic sports (e-sports) in which players can participate through wireless communication over the Internet, and for controlling such a game in the competition.

BACKGROUND ART

Match type games have been played by players on their terminals which connect to game servers over the Internet (see, for example, Patent Document 1). In recent years, many match type games are played on smartphones to allow players to enjoy the match type games easily at any time and any place.

Game competitions of e-sports have drawn attention. The e-sports competitions are held at particular sites including event venues. Players (participants) visit the event venue and play game matches in a tournament while spectators watch them play.

PRIOR ART DOCUMENT

Patent Document

[Patent Document 1] Japanese Patent No. 3668427

DISCLOSURE OF THE INVENTION

Problems to be Solved by the Invention

Traditional e-sports competitions are held in specific event venues and are limited in time and place. This makes the work of running competitions cumbersome and causes difficulty in holding such competitions frequently. In addition, players need to visit the venue where the intended game competition is held, which means that the competition is run poorly to impose time and place restrictions on players.

Since the current e-sports competitions have the nature of sports and are run in the form of events, it is necessary for competition organizers to secure financial and human resources for venue arrangements, preparations (including installation of equipment and facilities and drawing of spectators), and security. It is also necessary for participating players to accept time and place restrictions as well as financial and physical burdens, so that a limited small number of players can participate, for example professional game players and players trying to become professionals.

It is thus an object of the present invention to provide a game management system for a network match puzzle game in which players can participate through Wireless communication over the Internet.

Means for Solving the Problems (1) A game management system according to the present invention is a management system for a network match puzzle game using portable user apparatuses each having a wireless communication capability. The game management system includes: in the puzzle game in which competing players alternately put blocks of different shapes in unoccupied space on a game board of a predetermined shape within a predetermined allotted time, a storage section storing competition schedule information including match start times of all matches of a tournament up to a final match, each of the match start times being calculated by using a game time per match based on a maximum turn number and the allotted time, the maximum turn number being set for each game board or for each shape and/or number of the blocks; a tournament management section configured to provide the competition schedule information for the user apparatus, to receive a competition entry request from the user apparatus, and to set pairings in the tournament; and a game management section configured to connect to each of the user apparatuses to establish a game session and to perform game control, and to simultaneously start control of games in the set pairings at the match start times included in the competition schedule information.

(2) In (1) described above, the game management section performs: game start processing of performing connection processing of establishing a game session with each of the user apparatuses of players in each of the set pairings and game start processing of delivering information about the game board and the plurality of blocks determined from the competition schedule information to each of the user apparatuses to start the game at the match start time; and game control processing of obtaining placement information including information about the block put on the game board and information about a position of the put block from the user apparatus of one of the competing players and delivering the placement information of the one player to the user apparatus of the opponent player whose turn starts next.

(3) In (2) described above, the game control processing includes randomly producing an event occurrence trigger in delivering the placement information of the one player to the user apparatus of the opponent player whose turn starts next and performing event processing on the plurality of blocks provided at time of the match start.

(4) In (3) described above, the event processing may be processing of adding a new block to the plurality of blocks provided at the time of match start, processing of removing at least one block from the plurality of blocks provided at the time of match start, or processing of replacing at least one block of the plurality of blocks provided at the time of match start with another block of a different shape.

(5) In (2) to (4) described above, the user apparatus may be configured to add authentication information capable of authentication according to a predetermined authentication algorithm to the placement information in transmitting the placement information. The game management section may be configured to perform authentication processing using the authentication information based on the predetermined authentication algorithm when the placement information is provided from the user apparatus, and to perform the game control processing when the result of the authentication is OK.

(6) In (2) to (5) described above, the game control processing may include processing of determining timeout notified through allotted time countdown processing performed in the user apparatus.

(7) In (1) to (6) described above, the system may further include a competition running control section configured to produce the competition schedule information. The competition running control section may be configured to allow setting of at least two different game boards in all the matches of the tournament up to the final match and to produce the competition schedule information including the match start times of all the matches up to the final match based on a first game time per match in a first game board of the game boards and a second game time per match in a second game board of the game boards different from the first game board. The game management section may be configured to set the different game boards based on the competition schedule information in all the matches of the tournament up to the final match to perform game control.

(8) In (1) to (7) described above, the management system may be configured to further include: a game log management section configured to receive, from the user apparatus of each of the competing players, the placement information about the block put on the game board by the player, to store the received placement information on a time-series basis, to link a game log stored on a time-series basis to a search tag facilitating search by competition, by game board, by player, or by any combination thereof, and to store the game log in the storage section; and a service management section configured to extract the game log searched for based on the search tag and to transmit the extracted game log to the user apparatus.

(9) According to the present invention, a management apparatus for a network match puzzle game using portable user apparatuses each having a wireless communication capability includes: in the puzzle game in which competing players alternately put blocks of different shapes in unoccupied space on a game board of a predetermined shape within a predetermined allotted time, a storage section storing competition schedule information including match start times of all matches of a tournament up to a final match, each of the match start times being calculated by using a game time per match based on a maximum turn number and the allotted time, the maximum turn number being set for each game board or for each shape and/or number of the blocks; a tournament management section configured to provide the competition schedule information for the user apparatus, to receive a competition entry request from the user apparatus, and to set pairings in the tournament; and a game management section configured to connect to each of the user apparatuses to establish a game session and to perform game control, and to simultaneously start control of games in the set pairings at the match start times included in the competition schedule information.

(10) According to the present invention, a program for causing a computer to perform game management processing for a network match puzzle game using portable user apparatuses each having a wireless communication capability is configured to cause the computer to provide: in the puzzle game in which competing players alternately put blocks of different shapes in unoccupied space on a game board of a predetermined shape within a predetermined allotted time, a first function of storing competition schedule information including match start times of all matches of a tournament up to a final match, each of the match start times being calculated by using a game time per match based on a maximum turn number and the allotted time, the maximum turn number being set for each game board or for each shape and/or number of the blocks; a second function of providing the competition schedule information for the user apparatus, receiving a competition entry request from the user apparatus, and setting pairings in the tournament; and a third function of connecting to each of the user apparatuses to establish a game session and performing game control, and simultaneously starting control of games in the set pairings at the match start times included in the competition schedule information.

Technical Advantages

According to the present invention, it is possible to hold the competition of the network match puzzle game in the tournament in which users easily participate without time and place restrictions and to realize the competition running environment with reduced cost and easier participation of users by generally simplifying the manner of holding and running the game competition.

Specifically, the game management system according to the present invention provides the mechanism to hold the competition of the network match puzzle game in which players alternately put the blocks of different shapes in unoccupied space on the game board of the predetermined shape within the predetermined allotted time. The competition schedule information including the start times of all the matches up to the final match of the tournament is set by using the game time per match determined from the maximum turn number set for each game board or for each shape and/or number of blocks and the allotted time. The competition schedule information is notified to players who enter the competition.

In all the matches up to the final match, the match start times of the first round, second round, third round, . . . , semifinal match, and final match are preset times, and for example, the plurality of matches in the first round are simultaneously started at the match start time.

Since the puzzle game is played by alternately putting the blocks of the different shapes in unoccupied space on the game board of the predetermined shape within the allotted time, the game time per match before the determination of winning or losing is short, and is determined in advance based on the maximum turn number and the like. Since the plurality of matches in one round are simultaneously started, the match start time of each round in the tournament is provided as the competition schedule at the time of entry to the competition.

The user can play the match on the user apparatus having the wireless communication capability and thus can participate in the competition without place restrictions. In addition, the user is notified in advance of the competition holding schedule of the puzzle game of which one match ends in a short time period, so that the user experiences substantially reduced time restrictions imposed by participation in the competition. The reduced time and place restrictions can realize the environment in which the user can easily participate in the competition.

It is possible for the competition organizer to hold the competition without time and place restrictions simply by registering the competition holding information about the game board, the blocks, and the allotted time. For example, a plurality of competitions can be held in a day, different competitions can be held in the same time slot, or competitions can be held in any time slot such as in the midnight or early morning. It is thus possible to generally simplify the manner of holding and running the game competition and to realize the competition running environment with reduced cost and easier participation of users.

BRIEF DESCRIPTION OF THE DRAWINGS

FIG. 7 A diagram showing an example of game master information according to Embodiment 1 of the present invention.

FIG. 8 A diagram showing an example of competition holding information according to Embodiment 1 of the present invention.

FIG. 9 A diagram showing an example of competition schedule information according to Embodiment 1 of the present invention.

FIG. 10 A diagram showing an example of the competition schedule information with different game boards according to Embodiment 1 of the present invention.

FIG. 12 A diagram showing pairing setting information, a game log, and an example of game record display based on the game log according to Embodiment 1 of the present invention.

FIG. 13 A diagram showing an example of game record information according to Embodiment 1 of the present invention.

MODE FOR CARRYING OUT THE INVENTION

Embodiments of the present invention will hereinafter be described with reference to the accompanying drawings.

Embodiment 1

Figure 1:
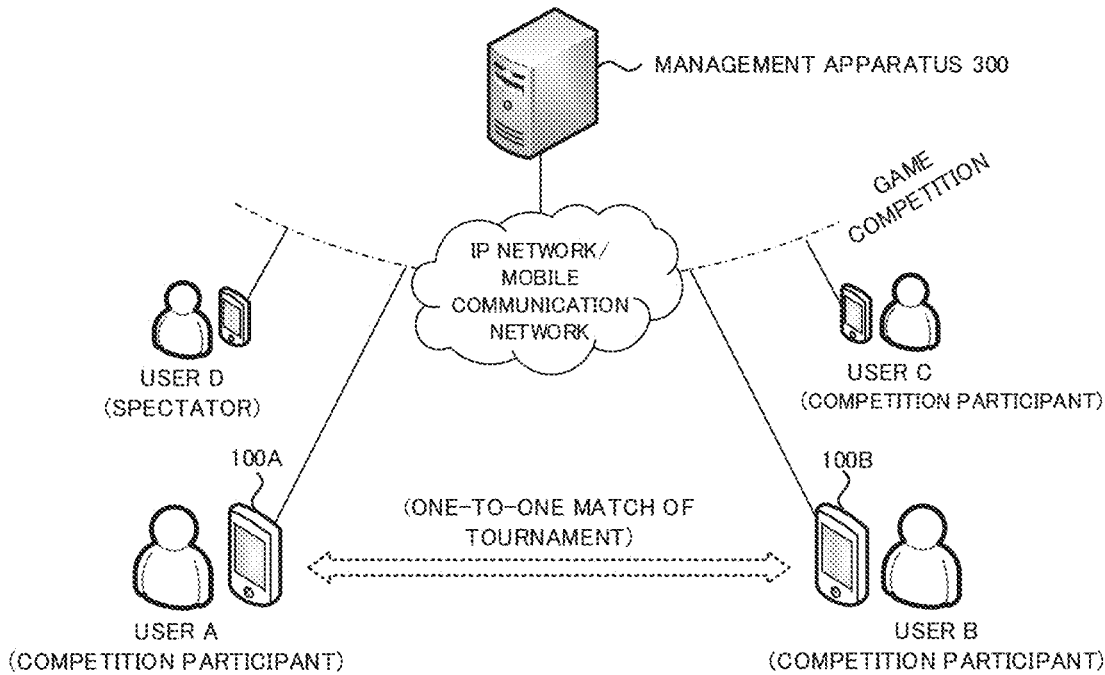
FIG. 1 A network configuration diagram of a management system for a network match puzzle game according to Embodiment 1 of the present invention.

FIGS. 1 to 15 are diagrams showing a game management system according to Embodiment 1. FIG. 1 is a network configuration diagram of the management system for a network match puzzle game according to Embodiment 1. Players who wish to participate in a competition can connect to a management apparatus 300 from a user apparatus 100 having a wireless communication capability to fight in the competition.

For example, a user apparatus 100A of a user A and a user apparatus 100B of a user B each connect to the management apparatus 300 through wireless communication over an Internet Protocol (IP) network or a Mobile Communication Network. The management apparatus 300 establishes a game session between the user A and the user B who wish to play a match in a tournament to control the game match between the user A and the user B. In an example of FIG. 1, users C and D are spectators.

The user apparatuses 100 (100A, 100B) are multifunctional mobile phones including smartphones or mobile terminals including Personal Digital Assistants (PDAs), laptop computers, and tablet terminals. The user apparatus 100 is an information processing apparatus having a communication function and a computing function, and must have a wireless communication function but may or may not have a talking function. This applies to the user apparatuses 100C, 100D.

Figure 2:
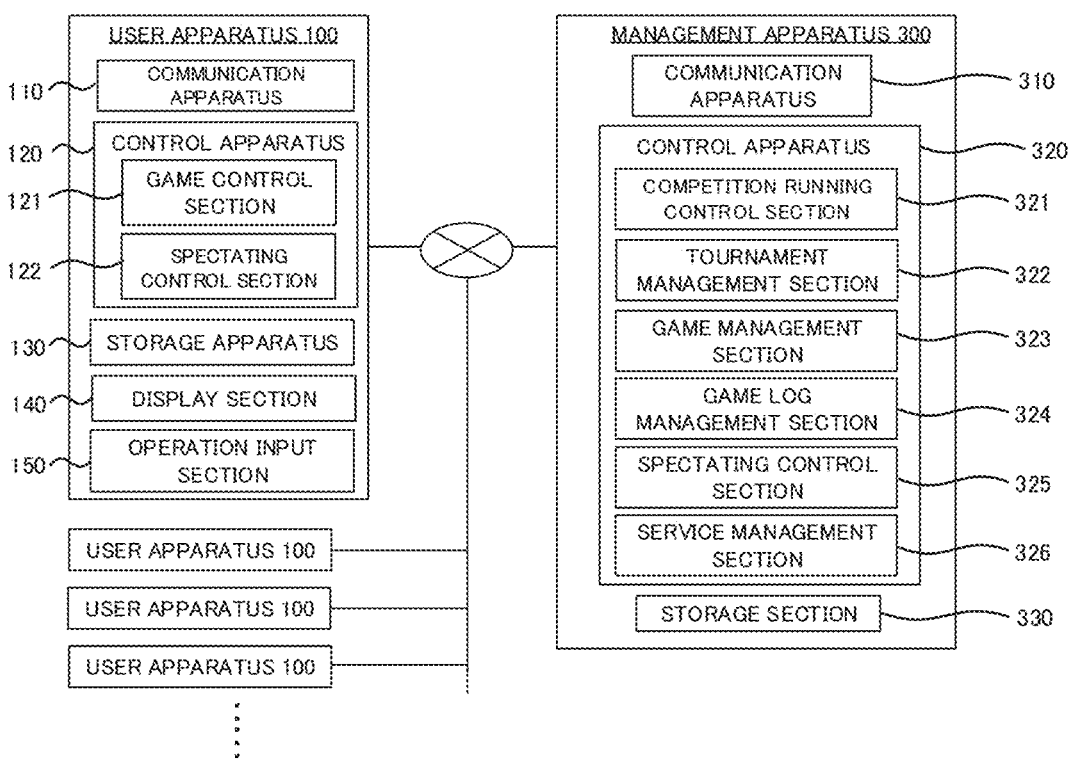
FIG. 2 A functional block diagram for explaining the functions of a user apparatus and a management apparatus according to Embodiment 1 of the present invention.

FIG. 2 is a functional block diagram for explaining the functions of the user apparatus 100 and the management apparatus 300.

The user apparatus 100 includes a communication apparatus 110, a control apparatus 120, a storage apparatus 130, a display section 140, and an operation input section 150. The display section 140 and the operation input section 150 can be provided integrally as a touch panel display/input apparatus. The player can operate the touch panel to select and move any of blocks onto a game board.

The control apparatus 120 includes a game control section 121 and a spectating control section 122. The game control section 121 and the spectating control section 122 are provided as a single game application program (game client) which can be downloaded directly from the management apparatus 300 or from a predetermined download site or server and installed on the user apparatus 100. Alternatively, the game control section 121 and the spectating control section 122 may be provided separately. In this case, the user serving as the player is only required to install a game application program including only the game control section 121, and a spectator is only required to install a game application program including only the spectating control section 122.

In response to operation input from the user, the game control section 121 displays various types of screens previously stored in the storage apparatus 130 on the display section 140 and performs control for display of competition holding notification information, control for display of and input to a competition entry registration screen, and game processing including display of a game screen.

The management apparatus 300 supports competition holding and running for the network match puzzle game and game control for each game match in the tournament game competition. The management apparatus 310 includes a communication apparatus 310, a control apparatus 320, and a storage apparatus 330.

The communication apparatus 310 controls simultaneous connection processing in which a plurality of players participating in the tournament competition simultaneously connect to the management apparatus 300, and maintains the established game session between the user apparatuses 100. The communication apparatus 310 controls data communication of information received and transmitted (delivered) between the user apparatuses 100 in the maintained game session.

The control apparatus 320 includes a competition running control section 321, a tournament management section 322, a game management section 323, a game log management section 324, a spectating control section 325, and a service management section 326.

Figure 3:
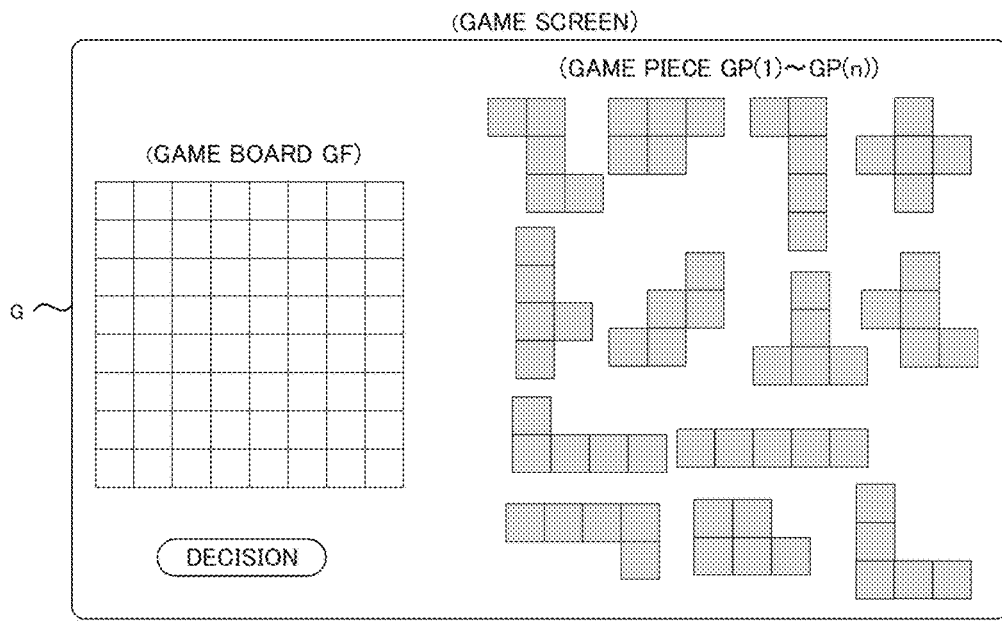
FIG. 3 A diagram for explaining a match game according to Embodiment 1 of the present invention and showing an example of a game screen of the puzzle game.

Next, the puzzle game according to Embodiment 1 and how to play a match are described. FIG. 3 is a diagram for explaining the match game according to Embodiment 1 and showing an example of the game screen of the puzzle game. As shown in FIG. 3, the puzzle game according to Embodiment 1 is played by competing players alternately putting blocks of different shapes in unoccupied space on a game board GF of a predetermined shape within a predetermined allotted time.

The game board GF is, for example, a game field having squares of a predetermined size arranged in an n-by-n matrix, and a game piece GP is a block formed by combining two or more squares. The game pieces GP include blocks of different shapes depending on the combination of squares, and game pieces GP(1) to GP(n) are displayed in the game screen.

The game board GF has any shape such as a convex shape or a concave shape other than the box shape of the n-by-n matrix. The number of the game pieces GP depends on the size of the game board GF (the number of squares) or the shapes of the game pieces GP (the shape formed by combining squares). The number and the shapes of the game pieces GP are designed to determine winning or losing in all matches. For example, the number of the game pieces GP can be set or the shapes of the game pieces GP can be designed such that all the game pieces GP cannot be put in the space on the game board.

Figure 4:
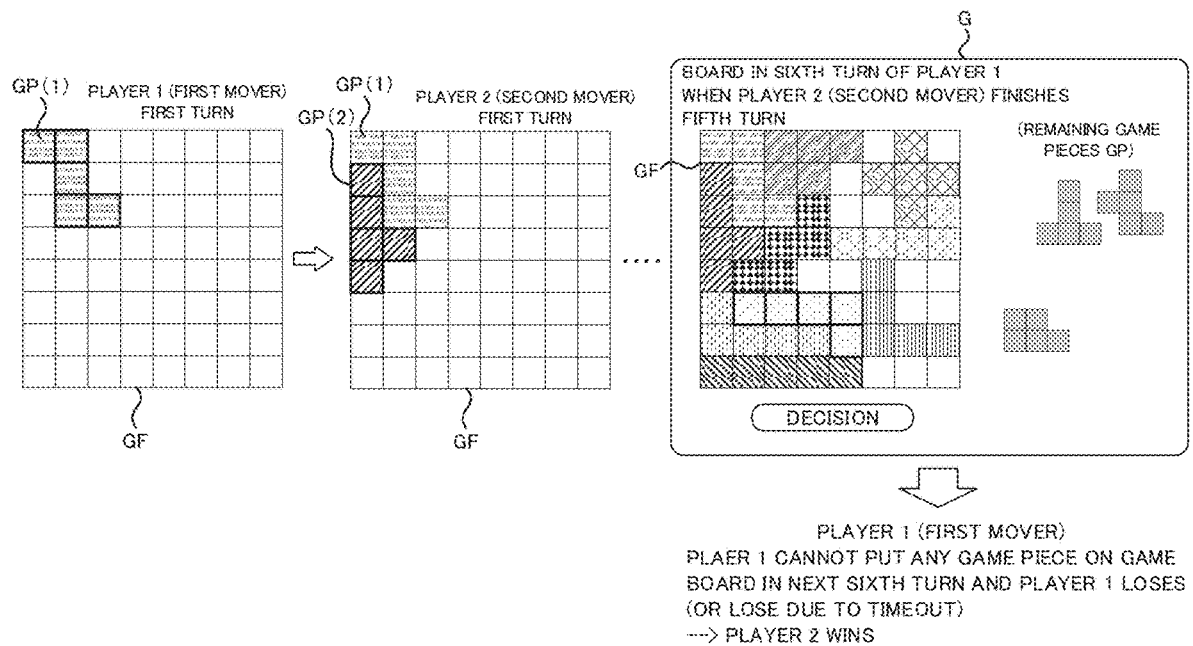
FIG. 4 A diagram for explaining the match game according to Embodiment 1 of the present invention and illustrating how the match game proceeds.

FIG. 4 is a diagram for explaining the match puzzle game according to Embodiment 1 and illustrating how the match puzzle game proceeds. The match puzzle game according to Embodiment 1 is a turn-based game in which two competitive players alternately put game pieces GP one by one in unoccupied space on the game board GF. The game piece GP can be put only in unoccupied space on the game board GF, and a game piece GP cannot be put over another game piece GP already put in the space on the game board GF. In other words, a game piece GP is controlled to be put in unoccupied space on the game board GF other than the space where another game piece GP is already put.

As shown in FIG. 4, a player 1 (first mover) arbitrarily selects and moves a game piece GP(1) into space on the game board GF in a first turn. Then, a player 2 (second mover) arbitrarily selects and moves a game piece GP(2) into unoccupied space on the game board GF on which the game piece GP(1) is put. While the game piece GP(1) and the game piece GP(2) are put next to each other without any gap between them in the example of FIG. 4, the player can freely select and move the game piece GP(1) to any position in unoccupied space. The game piece GP is controlled to be rotatable in the plane of the game board GF such that the player can change the orientation of the game piece GP by 90 degrees, 180 degrees, 270 degrees, and 360 degrees.

As the game turns proceed, the game board GF has more game pieces GP put thereon. The example of FIG. 4 shows the board in the sixth turn (the board in the sixth turn of the player 1 after the player 2 (second mover) finishes the fifth turn) and the remaining game pieces. In this case, the player 1 (first mover) cannot put any of the remaining game pieces GP in the unoccupied space on the game board GF. Thus, the winning and losing are determined with the player 1 as a loser and the player 2 as a winner.

When the player cannot put any game piece GP in the unoccupied space on the game board GF within an allotted time period in the competitive puzzle game according to Embodiment 1, the player loses due to timeout. The allotted time is counted down after each turn of each player starts. When a player uses up the allocated time and the remaining time is "zero," the player loses.

When the player cannot put any of the remaining game pieces GP in the unoccupied space on the game board GF as in the example of FIG. 4, the player also loses inevitably due to timeout. Alternatively, the player who cannot put any game piece GP may be determined to be a loser and the outcome of the match may be decided without waiting for the countdown of the allotted time by comparing the number and shapes of squares in the unoccupied space on the game board GF with the number and shapes of squares of the remaining game pieces GP.

Figure 5:
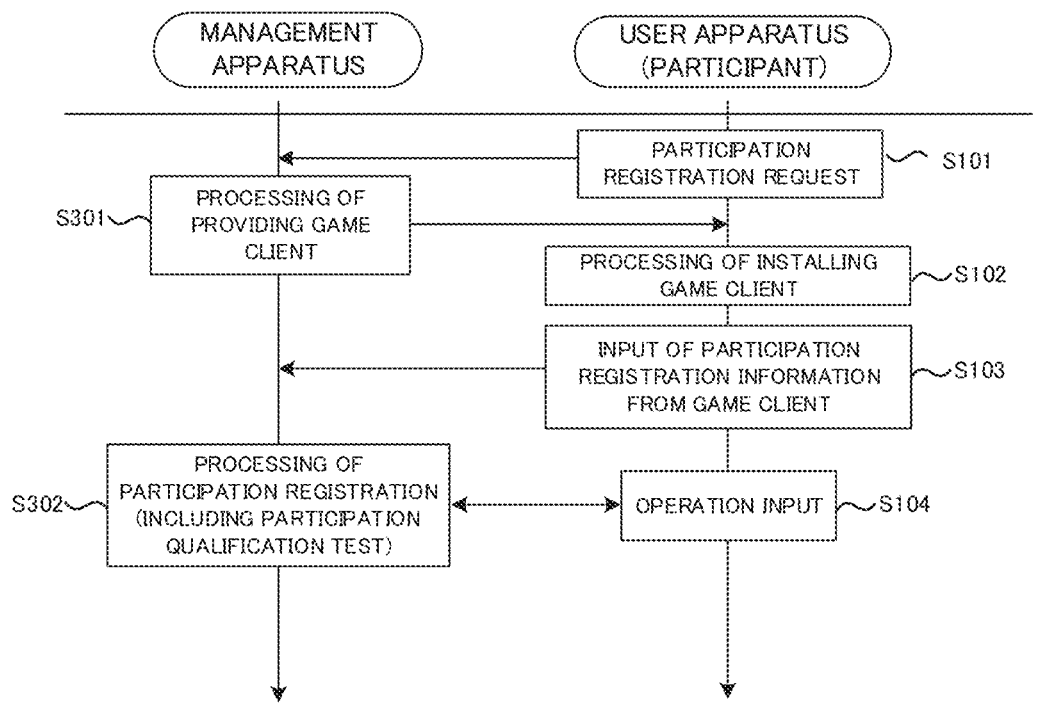
FIG. 5 A flow chart showing participation registration processing performed by the game management system according to Embodiment 1 of the present invention.

Next, the competition holding and running for the network match puzzle game and the game processing are described in more detail. FIG. 5 is a flow chart showing participation registration processing performed by the game management system according to Embodiment 1. The player (participant) connects to the management apparatus 300 from the user apparatus 100 and transmits a participation registration request (S101). Upon reception of the participation registration request, the management apparatus 300 provides a game client (S301). The user apparatus 100 installs the game client (S102). The game client can be downloaded from a Web site (a server) other than the management apparatus 300 as described above.

When the player starts the game client, the game client (the control section 121) causes the user apparatus 100 to display a participation registration screen to receive input of participation registration information (S103). The participation registration information includes, for example, personal information including the address, name, age, and contact information (such as telephone number and mail address), and player information including the nickname and thumbnail image of the player.

The game client (game control section 121) transmits the input participation registration information to the management apparatus 300. Upon reception of the participation registration information, the management apparatus 300 (competition running control section 321) performs player registration by assigning identification information such as player ID thereto and stores the information in a player management table in the storage apparatus 330 (S302). The player ID is associated with history information of each player including competition participation history, match history (each opponent player and the winning or losing), and game log (game record). The player management table and the history information can be managed in separate tables or the same table.

It should be noted that a participation qualification test may be performed. The participation qualification test is, for example, a test for determining whether or not a player has a certain level of game skill or knowledge (S302, S104). Such tests include quizzes and test games. The test game is a puzzle game match between a person who wishes to participate and a Non Player Character (NPC) operated by a computer as an opponent. When the person who wishes to participate wins the match against the NPC, the person is determined to be qualified to participate and is permitted to perform participation registration. Even when the person loses the match against the NPC, the person can be given an opportunity to play again. It should be noted that the participation qualification test is only illustrative and that the participation registration may be permitted unconditionally or may be permitted on the condition that a pay ticket is bought as a participation fee.

Figure 6:
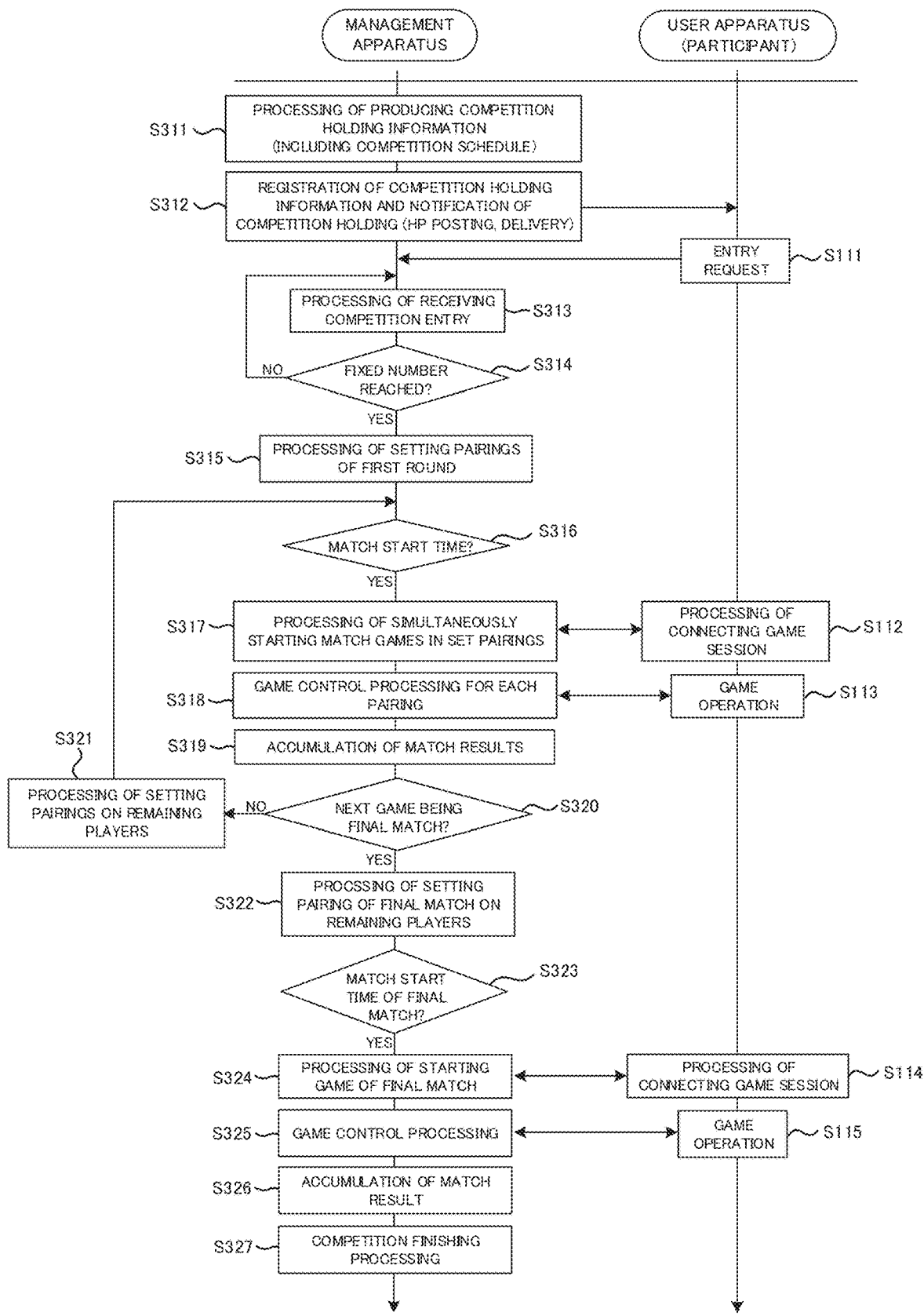
FIG. 6 A flow chart showing game competition holding and running processing according to Embodiment 1 of the present invention.

FIG. 6 is a flow chart showing game competition holding and running processing according to Embodiment 1. The organizer of the game competition produces (creates) competition holding information (S311).

FIG. 7 is a diagram showing an example of game master information according to Embodiment 1. In Embodiment 1, the number and the shapes of blocks serving as the game pieces GP are preset for the game board GF such that different numbers and shapes of the game pieces GP are set depending on the size and/or the shape of the game board GF. A maximum turn number is preset based on the shape of the game board GF, the number of squares on the game board GF, the shapes of the game pieces, and the number of the game pieces. Thus, the maximum turn number can be set for each game board GF or each shape and/or number of game pieces GP (blocks). For example, the competition running control section 321 displays a master information edit screen on a computer operated by a manager, receives, as the game master information, input of the ID of a game board which can be registered and edited, the number of squares in the game field, the maximum turn number, the number of game pieces, the IDs of available game pieces and the like, and stores the input information.

One turn described in Embodiment 1 includes a single move made by a first mover and a single move made by a second mover. Thus, the first move made by the first mover is in the first turn, and the second move made by the first mover is in the second turn. One turn includes the allotted times of the first mover and the second mover, and the game proceeds accordingly.

FIG. 8 is a diagram showing an example of the competition holding information according to Embodiment 1. The organizer of the game competition can set competition registration information including a competition ID, a competition name, the number of entries, a competition start time, the ID of a game board for use in the competition, an allotted time, a communication waiting time, and an interval between matches. The competition running control section 321 controls the registration of the competition registration information in response to input from the manager and creates competition time management information based on the registered competition registration information.

The competition running control section 321 uses the set game board ID to specify the associated game master information and calculates the maximum match time per game (game time). Specifically, the competition running control section 321 multiplies the maximum turn number by the allotted time (doubled allotted time to include the allocated times of the two players of the first mover and the second mover) to calculate a first time period. The competition running control section 321 also multiplies the maximum turn number by the communication waiting time determined from the time taken for communication between the user apparatus 100 and the management apparatus 300 (doubled communication waiting time to include communication waiting times of the two players of the first mover and the second mover) to calculate a second time period. The competition running control section 321 adds the first time period and the second time period to calculate the maximum match time per game (competition time management information).

Once the maximum match time per game is calculated in this manner, tournament competition schedule information can be produced. Specifically, the competition running control section 321 sets the competition start time registered in the competition registration information as the game start time of the first round, and sets the time calculated by adding the maximum match time and the interval between matches to the game start time of the first round as the game start time of the second round. The game start times of all the rounds set based on the number of entries are calculated up to the final match of the tournament. In the example of FIG. 8, the competition running control section 321 calculates game start times T1, T2, T3, and T4 of the first round, second round, semifinal match, and final match, respectively, and produces the competition schedule information including the game start time (T1), the final match ending time (T5), and the maximum play time from the first match to the final match (TL). The competition registration information, the competition time management information, and the competition schedule information are stored as the competition holding information in the storage apparatus 300.

FIG. 9 is a diagram showing another example of the competition schedule information. The example of FIG. 8 shows the competition holding information with the game board ID "GF00001," while FIG. 9 shows exemplary competition schedule information with the competition ID "GP0002" and the game board ID "GF0008." In the example of FIG. 9, players of as many as 1024 entries participate but the competition ends in approximately 44 minutes.

FIG. 10 is a diagram showing an example of the competition schedule information with different game boards. The competition running control section 321 can perform control to register a plurality of game boards GF for use in a single game competition. For example, different game boards GF can be set such that a first game board is used from the first round to the quarterfinal match and a second game board is used in the semifinal match and the final match. When different game boards are used, the interval between matches may be changed during the course of the competition.

The competition running control section 321 performs control such that at least two different game boards GF can be set for use in all the tournament matches up to the final match, calculates a first maximum match time per match for the first game board and a second maximum match time per match for the second game board different from the first game board, and produces the competition schedule information including the match start times of all the matches up to the final match of the tournament as shown in FIG. 10. The game management section 323 can perform game control by setting the different game boards based on the competition schedule information in all the matches up to the final match of the tournament.

Referring back to FIG. 6, after the production of the competition holding information as described above, the competition running control section 321 stores the produced competition holding information in the storage apparatus 300, and the tournament management section 322 performs competition notification processing of providing the competition schedule information for the user apparatus 100 registered as the player. The information is provided in this case, for example by posting on a predetermined Web site or delivery of an e-mail to the mail address of the registered player, to notify the competition holding (S312).

The tournament management section 322 receives a competition entry request from the user apparatus 100 with reference to the number of entries set in the competition registration information (S313, S111). The tournament management section 322 receives competition entry requests until a fixed number is reached (S314), and finishes the reception of entry when the fixed number is reached (YES at S314). Then, the tournament management section 322 sets pairings in the tournament (S315). It should be noted that the processing at S314 may be configured to finish the reception of entry, for example after the elapse of a predetermined reception time period determined based on the match start time of the first round, even when the fixed number is not reached.

The processing of setting pairings can be performed by randomly extracting players to be paired in each match according to a predetermined random sampling method, extracting players to be paired in each match based on the match history so as to avoid the same pairing, or extracting players to be paired in each match based on player ranking determined from the match history in which high ranking players are given a seed.

The number of entries set in the competition registration information may be different from the number of participating players whose entries are received. For example, in the tournament with some players given a seed, those players skip the first and the second rounds, and the number of persons whose entries are received can be reduced accordingly. In addition, the computer (NPC) in the management apparatus 300 can be randomly used as an opponent. In this case, the reception of entry can be performed until a fixed number smaller than the set number of entries is reached.

When the number of persons who request the competition entry is smaller than the set number of entries, the pairings in the tournament can be set by changing into a tournament chart with some players given a seed, or by compensating for the lack of opponents with the computer (NPC) as described above.

The game management section 323 waits until the game start time (S316), and when the game start time comes (YES at S316), performs processing of simultaneously starting a plurality of match games in the set pairings of the first round (S317). The game management section 323 performs processing of connection with the user apparatuses 100 of the players in the pairings before the match start time. Then, at the match start time, the game management section 323 establishes game sessions between the user apparatuses 100 of the players in the pairings (S112) and performs controls to simultaneously start the plurality of match games of the first round.

As described above, the game management section 323 according to Embodiment 1 simultaneously starts the control of the plurality of games in the set pairings at the match start time determined from the competition schedule, and in response to game operation on each user apparatus 100 (S113), performs game control processing for each pairing (S318).

Game logs are accumulated during the game control performed by the game management section 323. The game log is information of recorded moves of players and includes information about each move of the first mover and the second mover in each turn (information indicating which game piece is put at which position on the game board (coordinate on the game board)). The game log is accumulated by the game log management section 324. The game log management section 324 records, for each match ID, the move information of each competing player in each turn.

The game management section 323 records a match result (winning or losing) through the game control (S319). The match result includes the winner player and the loser player and is stored for each match ID. For example, the match result and the game log are linked to each other with the match ID, and the match result is recorded in the game log.

After the first round is ended, the tournament management section 322 performs processing of setting pairings in the second round. Specifically, the tournament management section 322 determines whether or not the next game is the final match (S320), and when it is determined that the next game is not the final match, performs processing of setting parings in the next round on the remaining players based on the accumulated match result (S321). Then, the game management section 323 returns to step S316, simultaneously starts a plurality of matches of the next round at the match start time of the next round determined from the competition schedule, and performs game control processing for each pairing in response to game operation made by each remaining player on the user apparatus 100. The management apparatus 300 subsequently repeats the operations from step S316 to step S321 until the final match, and thus runs the competition such that a plurality of matches are simultaneously started at the match start time of the next round determined from the competition schedule information.

When it is determined that the next game is the final match at step S320 (YES at S320), the tournament management section 322 performs processing of setting the pairing on the remaining two players who won the semifinal match (S322). At the match start time of the final match in the competition schedule information (YES at S323), the game management section 323 establishes a game session between the user apparatuses 100 of the players in the pairing (S324, S114) to starts the final match. Then, the game management section 323 performs game control processing for the final match (S325) in response to game operation on each user apparatus 100 (S115). The game management section 323 records the match result of the final match through the game control, and the game log management section 324 records, for each match ID, the move information of each competing player in the final match in each turn (S326).

After the final match is ended, the competition running control section 321 performs competition finishing processing (S327). The competition finishing processing includes, for example, processing of awarding a prize to the champion or the higher ranking players including the first to third place winners of the held competition. When the input of the participation registration information at step S103 in FIG. 5 accepts registration of player's account information, the competition running control section 321 can perform processing of paying predetermined prize money into the account designated by the player from a predetermined account of the competition organizer. The prize may be a privilege such as a coupon or a discount ticket other than money. The competition running control section 321 can also perform competition finishing processing of awarding a prize for participation such as a coupon or a discount ticket to each players who participated in the competition.

Figure 11:
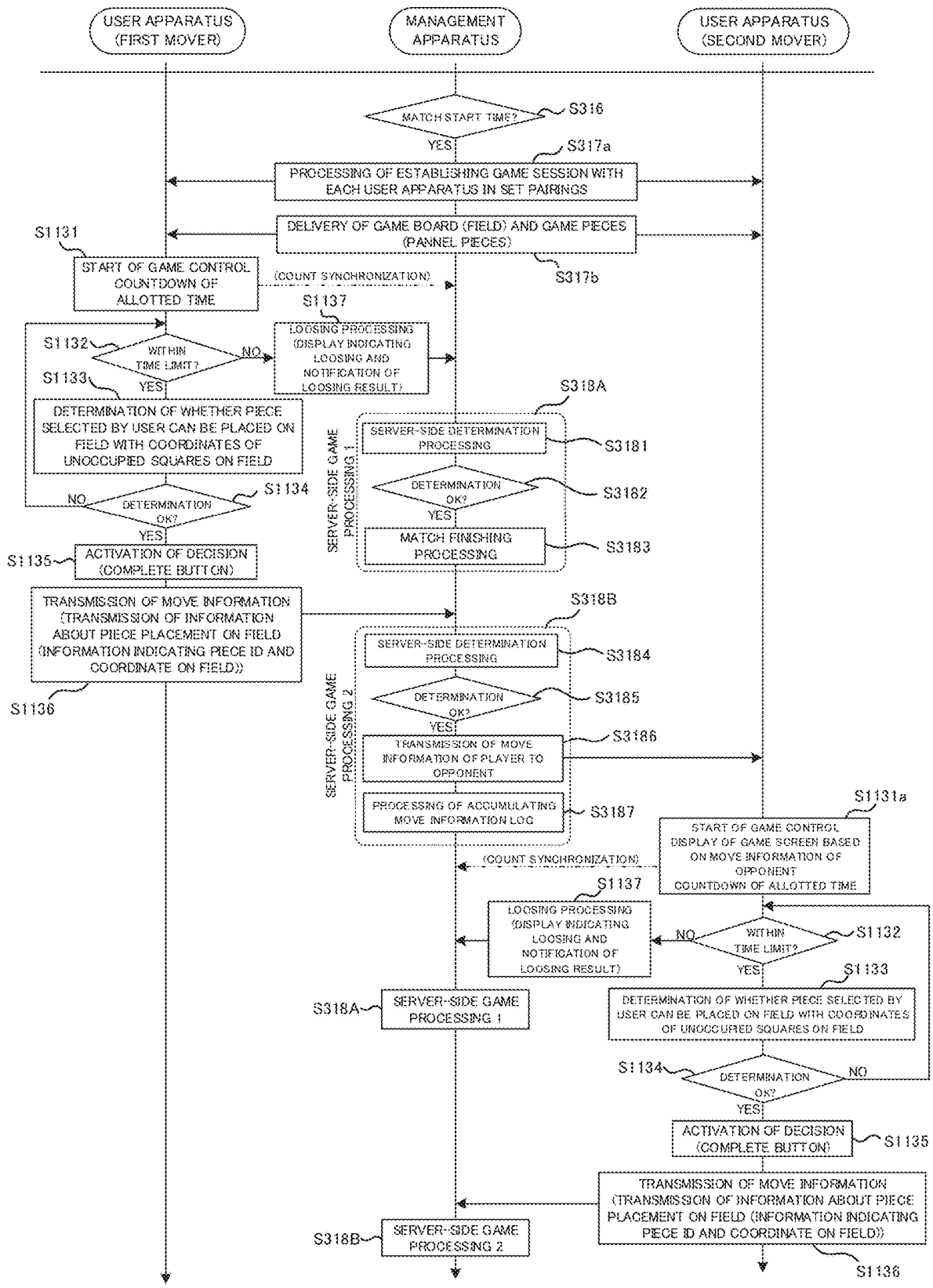
FIG. 11 A flow chart showing game control processing according to Embodiment 1 of the present invention.

FIG. 11 is a flow chart showing the game control processing according to Embodiment 1. The game management section 323 of the management apparatus 300 waits until the match start time set in the competition schedule information (S316). When the match start time set in the competition schedule information comes (YES at S316), the game management section 323 performs the processing of establishing a game session with each user apparatus 100 in the set pairing (S317a). For example, in a tournament competition with 32 participants, the game management section 323 establishes and maintains 16 game sessions for matches of 16 pairs in the processing of the first round.

Next, the game management section 323 refers to the competition schedule information to specify the game board GF for use in this round. The game management section 323 delivers the game information including the specified game board GF, game pieces GP, and allotted time to the user apparatus 100 of each player (S317b). It should be noted that the first mover and the second mover of each match during the game can be determined in advance. For example, the game management section 323 can determine the first movers in the pairings set by the tournament management section 323 in descending order of performance recorded in the match history associated with the player information (for example, in descending order of number of wins or descending order of winning percentage). Conversely, the game management section 323 may determine the first move players in ascending order of performance recorded in the match history associated with the player information (for example, in ascending order of number of wins or ascending order of winning percentage). The game management section 323 can deliver the game information including the information about the first mover and the second mover at the time of match start to each user apparatus 100.

The game management section 323 performs the processing of establishing the game session with the user apparatuses 100 of each player in the set pairings and, when the match start time comes, performs the game start processing of delivering the information about the game board GF and the plurality of game pieces (blocks) GP determined from the competition schedule information to each user apparatus 100 to start the game.

Upon reception of the delivered game information, the user apparatus 100 performs game control on the game client side. The game control section 121 starts the game control to display a predetermined game screen including the delivered game board GF and game pieces GP on the user apparatus 100. The game control section 121 sets the allotted time included in the game information. When the information about first mover and second mover indicates "first mover," the game control section 121 starts processing of counting down the allotted time and activates game operation such that the player is allowed to select and put one of the game pieces GP in unoccupied space on the game board GF (S1131). The game control section 121 performs control to allow rotational operation of the selected game piece GP in the plane of the game board.

While the game control section 121 starts the game play with the first mover in response to the reception of the delivered game information, the operation is not limited thereto. For example, the game control section 121 may perform control such that the game screen is displayed on the user apparatus 100, the allotted time is set, then countdown processing for several seconds is performed before start of the game, and when "zero" is reached, game operation is activated to allow the player to select and put one of the game pieces GP in unoccupied space on the game board GF.

The game control section 121 performs placement permission determination processing of determining whether or not the selected game piece GP can be placed on the game board (S1133). The placement permission determination processing determines, for example, whether or not the position of the newly placed game piece GP is located in the squares constituting the game board GF and overlaps with none of the already placed game piece (s) on the game board GF. The game control section 121 performs control to place no game piece GP in space outside the game board or in a region where another game piece GP is already placed.

The game control section 121 monitors whether or not the result of the placement permission determination processing shows that the placement is permitted (OK) within a time limit during the game operation of the player (S1134), and when the determination result is OK, activates a decision button. The player selects the activated decision button and finishes his turn. In response to the selection of the decision button, the game control section 121 finishes the allotted time countdown processing and transmits the move information to the management apparatus 300. The move information includes information about the placement of the game piece on the game board (game field) GF (information indicating the game piece ID and the coordinate on the game board where the game piece is placed).

As described above, the game control section 121 performs the placement permission determination processing in response to the game operation of the player while performing the allotted time countdown processing. When the result of the placement permission determination processing is not OK within the time limit based on the allotted time and the decision button cannot be selected, timeout is determined and the player loses. In response to the fact that the result of the placement permission determination processing is not OK within the time limit or that the decision button cannot be selected at step S1132, the game processing section 121 proceeds to step S1137 to perform losing processing. The losing processing includes processing of displaying a game screen which shows the fact of losing and transmitting information which indicates the fact of losing to the management apparatus 300.

The management apparatus 300 performs server-side game processing 1 (S318A) and server-side game processing 2 (S318B). The server-side game processing 1 is processing of determining the losing and finishing the match associated with step S1137 performed in the user apparatus 100. Upon reception of the information indicating the fact of losing from the user apparatus 100, the game management section 323 performs server-side determination processing 1 (S3181).

The game management section 323 receives a synchronization signal from the allotted time countdown processing started at step S1131 in the user apparatus 100, and the allotted time countdown processing is also performed in the management apparatus 300. Thus, the game management section 323 performs the allotted time countdown processing on the management apparatus 300 side and timeout determination processing on the server side. When the determination result also shows the timeout on the management apparatus 300 side (S3182), the game management section 323 performs match finishing processing of finishing the game control (S3183). When the communication waiting time is set as shown in FIG. 8, the game management section 323 performs the timeout determination processing in which the communication waiting time is taken into account. The communication waiting time is the time provided by including, for example, a communication delay depending on the communication environment between the user apparatus 100 and the management apparatus 300.

Upon reception of the move information from the user apparatus 100, the game management section 323 performs the server-side determination processing 2 (S3184). The server determination processing 2 determines whether the information about the placement of the game piece on the game board (game field) GF is permitted (OK) or not permitted (NG) based on the accumulated game log. For example, the game management section 323 specifies the number of squares and the shape of the placed game piece GP based on the ID of the game piece GP, compares the coordinate position of the placed game piece GP on the game board GF with the unoccupied space determined from the latest game log, and determines whether or not the position of the placed game piece GP is located within the unoccupied space determined from the latest game log. The server determination processing 2 is determination processing similar to the placement permission determination processing in the user apparatus 100.

When the result of the server-side determination processing 2 is OK (YES at S3185), the game management section 323 transmits move information to the opponent (S3186), and the game log management section 324 performs log accumulation processing of accumulating the move information in a game log (S3187). As described above, the management apparatus 300 performs the game control processing of obtaining the placement information about the game piece GP (block) placed on the game board GF and the position of the placed game piece GP (block) from the user apparatus 100 of one of the competing players and delivering the placement information to the user apparatus 100 of the other player whose turn starts next.

The user apparatus 100 of the second mover performs game screen update processing based on the move information of the first mover in a game screen on which the game board GF and the game pieces GP delivered at step S317b are displayed. Specifically, the user apparatus 100 performs the game screen update processing of specifying the game piece GP placed by the opponent player based on the game piece ID included in the received move information and placing the specified game piece GP on the game board based on the position information included in the move information. The user apparatus 100 (game control section 121) of the second mover starts game control including the game screen update processing based on the received move information (S1131a).

The game control section 121 of the second mover performs operations from steps S1131a to S1136 and S1137 similarly to the game control processing in the first mover described above and progress the game.

According to Embodiment 1, it is possible to hold the network match puzzle game competition of the tournament in which users easily participate without time and place restrictions and to realize the competition running environment with reduced cost and easier participation of users by generally simplifying the manner of holding and running the game competition.

The user can play the match on the user apparatus having the wireless communication capability and thus can participate in the competition without place restrictions. In addition, the user is notified in advance of the competition holding schedule of the puzzle game of which one match ends in a short time period, so that the user experiences substantially reduced time restrictions imposed by participation in the competition. The reduced time and place restrictions can realize the environment in which the user can easily participate in the competition.

It is possible for the competition organizer to hold the competition without time and place restrictions simply by registering the competition holding information about the game board, the game pieces, and the allotted time. For example, a plurality of competitions can be held in a day, different competitions can be held in the same time slot, or competitions can be held in any time slot such as in the midnight or early morning. It is thus possible to generally simplify the manner of holding and running the game competition and to realize the competition running environment with reduced cost and easier participation of users.

FIG. 12 is a diagram showing pairing setting information, a game log, and an example of game record display based on the game log according to Embodiment 1. In Embodiment 1, the match history of each player is accumulated as described above, and the pairing setting information in the held competition is accumulated as shown in the example of FIG. 12. Each competition includes a plurality of rounds, and each round is identified by its competition ID. The pairing setting information is accumulated for each competition name (competition ID) and includes a plurality of matches linked to the match IDs.

As shown in FIG. 12, the game log for each match ID includes accumulated move information of each competing player in each turn. Thus, the game log can be used to create game record information. The game record information is provided by the service management section 326. As shown in the example of FIG. 12, the service management section 326 specifies the game board GF used in the match from the competition holding information and places the game pieces GP recorded in the game log onto the specified game board GF to produce the game record information. For example, the squares constituting the game board GF are associated in advance with coordinate information for used in the game control described above, and the moves represented by the move information can be reproduced sequentially on the game board GF based on the game log. The game record information is a representation of the game log (a collection of move information) linked to the match ID on the game board GF.

FIG. 13 is a diagram showing an example of the game record information. The service management section 326 receives a request for delivering game record information from the user apparatus 100 (of a participating player or a spectator) and provides a function of retrieving the game record information. For example, the user apparatus 100 receives input of search conditions such as the competition name, match ID, and player from the game client and transmits the received conditions to the management apparatus 300. The service management section 326 searches the pairing setting information and the game log based on the received search conditions to extract the game log of the player and the match satisfying the conditions. The game record information including the extracted game log is provided (transmitted) to the user apparatus 100.

The game client of the user apparatus 100 can perform screen display processing similarly to that in the game control to display the received game record information on the screen. For example, when an automatic reproduction button is selected, the game client automatically displays the move information of the first mover and the second mover in the successive turns on the game board GF at predetermined time intervals based on the game record information. The game client can also be controlled to display the move information arranged in the order of turns one by one in response to selection of a previous move button or a next move button.

The processing of displaying the game record information may be performed in the service management section 326 instead of the user apparatus 100. For example, the service management section 326 may produce a display screen including game record information, transmit the screen to the user apparatus 100, and display the game record information in response to operation of the buttons on the user apparatus 100 described above.

As described above, the game log management section 324 according to Embodiment 1 receives, from each of the user apparatuses of the competing players, the placement information about the game piece GP put on the game board GF by each player, accumulates the received information in a game log on a time-series basis, links the game log to a search tag which facilitates search by competition, by game board, by player, or by any combination thereof, and stores the game log in the storage apparatus 300. The service management section 326 extracts the game log searched for based on the search tag, and transmits and provides the extracted game log to the user terminal apparatus (user apparatus 100).

The game record information may be fee-based or free. When the game record information is fee-based, a separate payment system can provide a payment function which can be used to collect a predetermined fee for providing the game record information. In addition, only the game record information of specific matches may be provided. For example, it is possible to provide only the game record information of the final match in each competition or only the game record information of the matches of the higher ranking players including the first to third place winners of one competition.

Figures 14, 15:
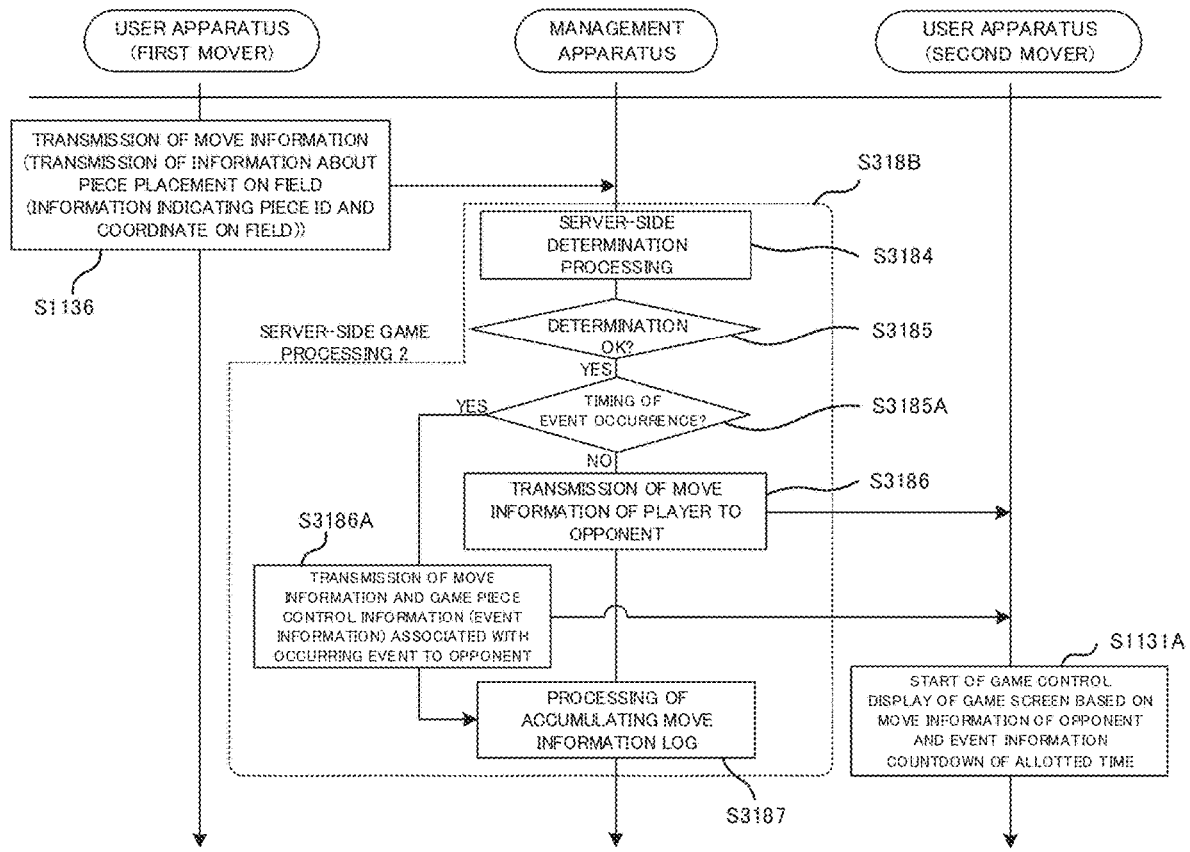
FIG. 14 A diagram illustrating a first variation of the present invention and showing an example of event management information used in game control during a match.
FIG. 15 A flow chart illustrating the first variation of the present invention and showing game control processing during a match to which event processing is applied.

FIG. 14 is a diagram illustrating a first variation of Embodiment 1 and showing an example of event management information used in game control during a match. From the standpoint of game fairness, acts of cheating in a game should be prevented as much as possible. To this end, in Embodiment 1, game control processing is configured such that, in delivery of placement information of one of two competing players to the user apparatus 100 of the opponent player whose turn starts next, an event occurrence trigger is randomly produced to perform event processing on a plurality of game pieces GP (blocks) provided at the time of match start.

For example, as shown in the example of FIG. 14, the event processing involves game piece control information for adding a new block to the plurality of game pieces GP provided at the time of match start, removing at least one block from the plurality of game pieces GP provided at the time of match start, and replacing at least one of the plurality of game pieces GP provided at the time of match start with another game piece GP of a different shape. The details of the event processing can be set as appropriate and are not limited to the example shown in FIG. 14. For example, the event processing may include changing the shape of the game board GF without changing the positions of the already placed game pieces GP or automatically progressing the game by the management apparatus 300 placing the game pieces GP several moves ahead.

For example, when one player uses an AI tool which can analyze the moves of the other opponent player and find the best move with a computer like the NPC described above, the event processing changes the plurality of game pieces GP provided at the time of match start and thus the analysis for finding the best move takes a long time to make it impossible to make a move within the allotted time. Furthermore, a more secure approach to preventing acts of cheating can be easily provided by changing the timing of the event occurrence or by changing the details of the event processing as appropriate.

FIG. 15 is a flow chart showing game control processing during a match to which the event processing in the first variation is applied. The example of FIG. 15 is an extracted portion of the processing shown in FIG. 11, and the same processing operations are designated with the same reference numbers and description thereof is omitted.

In the server-side game processing 2, the game management section 323 performs processing of determining whether or not the timing of event occurrence has come after the server-side determination processing 2. In other words, after the reception of move information, the game management section 323 performs event processing in transmitting the received move information to the opponent player. The game management section 323 refers to the timing of event processing in the example of FIG. 14 and determines whether or not the current game status satisfies an event processing timing condition based on the game log (S3185A). When the event processing timing condition is not satisfied, the game management section 323 performs normal game processing without event processing.

When it is determined that the current game status satisfies the event processing timing condition based on the game log at step S3185A, the game management section 323 proceeds to step S3186A to produce one of the events indicated in the event management information. The condition of the event processing occurrence timing can specify, for example, that an event should occur at the start of the second move in the third turn. The game management section 323 transmits the move information of one player and the game piece control information based on the event management information to the user apparatus 100 of the other opponent player who is waiting for his turn.

Upon reception of the move information and the game piece control information based on the event management information, the user apparatus 100 performs game screen update processing based on the move information of the opponent player and the game piece control information. Specifically, the user apparatus 100 performs the game screen update processing of specifying the game piece GP placed by the opponent player from the game piece ID included in the received move information, placing the specified game piece GP on the game board based on the position information included in the move information, and for example, adding a new block based on the game piece control information. The user apparatus 100 (game control section 121) starts the game control including the game screen update processing (51131A).

While Embodiment 1 has so far been described, the game management system can also provide a function of watching matches in the competition. Since the game client can include the spectating control section 122 as described above, the game client can be started in a spectating mode to display a play screen during a match. The spectating control section 122 connects to the management apparatus 300, obtains a list of matches, and transmits a request for spectating a match selected from the list of matches to the management apparatus 300. The spectating control section 325 of the management apparatus 300 extracts the game log of the match indicated by the received spectating request and transmits that game log to the user apparatus 100. The spectating control section 122 of the user apparatus 100 can perform spectating display processing of sequentially displaying game records created from the game log on the game screen.

The information for use in the game client of the user apparatus 100 can be held after encryption, and then decoded with an encryption key before use in various types of processing. The data (including the move information, and the game information about the game board GF and game pieces GP) can be passed between the user apparatus 100 and the management apparatus 300 through encrypted communication, for example using SSL/TLS.

The game client can store various types of information about the game board and the game pieces in advance for use in the tournament. In this case, the management apparatus 300 may deliver the game information including the game board ID specifying the game board GF and the identifications ID of the available game pieces GP at step S317a in FIG. 11. The game control section 121 of the user apparatus 100 can extract the game board and game pieces stored in the storage apparatus 130 that are specified in the received game information to display the game screen. The information about the competition including the game board and the game pieces stored in the storage apparatus 130 can be compressed and encrypted or subjected to encryption processing with an encryption key described above.

The game client can also have an existing function of program tampering detection or a function of analyzing tool detection. In this case, the management apparatus 300 can take measures such as account deactivation or forced elimination based on a tampering record provided from the tampering detecting function of the game client.

It is also possible to detect and take measures against acts of cheating such as automatic operation performed by AI or emulators with a device (including a PC) other than the legitimate game client or user apparatus 100. For example, authentication information created based on a predetermined authentication algorithm is added to data communicated between the management apparatus 300 and the legitimate game client to authenticate them.

The user apparatus 100 can add the authentication information at an arbitrary position in the move information transmitted to the management apparatus 300 without altering the move information itself. The authentication information includes a series of characters, numbers, symbols, or any combination thereof (for example, a password) for obtaining authentication or a hash, and is created according to a specific authentication algorithm. For example, the game client can use the authentication algorithm to create authentication information, add one or plurality of pieces of authentication information to one or more of the game piece ID, the coordinate information on the game board where the game piece is placed, and the time information included in the move information to provide the move information including the added authentication information, and transmits the move information to the management apparatus 300. Different authentication information can be created each time data communication is performed. The management apparatus 300 can continue the game control when the authentication result is OK, or when the authentication result is NG, determine an incomplete game due to detection of act of cheating or forcedly eliminate the player whose act of cheating is detected.

Since an automated operation application with a converted game client, AI, or an emulator does not perform data communication including the authentication information produced by the authentication algorithm, the management apparatus 300 (game management section 323) can detect cheating by performing authentication according to the authentication algorithm during the data communication. It should be noted that the cost for anti-tampering can be reduced due to the simple configuration which does not rely on any special user authentication mechanism such as an electronic certificate. The authentication processing using the authentication algorithm and the authentication information can be applied to the data communication after the game session is established.

The management apparatus 300 can also add different authentication information each time it transmits data to the game client and the game client can authenticate the data. In other words, both have the authentication algorithm and authenticate each other, so that a converted game client or an AI program using an emulator can be detected and appropriate measures can be taken such as removing them. In addition, the authentication algorithm can be changed regularly to detect acts of cheating more reliably.

Next, another example of the game style according to the present invention is described. The basic game rule is not changed in that competing players alternately put blocks (game pieces GP) of different shapes in unoccupied space on a game board GF of a predetermined shape within a predetermined allotted time, but an own card-type game style can be employed by each player using his pre-registered game pieces GP.

Specifically, in the example of FIG. 3, all the game pieces GP(1) to GP(n) selectable by the players are displayed in the game screen and the players take the game pieces GP(1) to GP(n) in the same game screen one by one as the game proceeds. The example of FIG. 3 illustrates a pool-type game style in which players take game pieces GP disposed (displayed) as a stock in the field (game field) one by one until selectable game pieces GP are exhausted and one of the players cannot use any game piece GP. On the other hand, the variation is of the own card-type game style in which each player selects arbitrary game pieces GP from the game pieces GP(1) to GP(n) before the start of a game and performs deck registration of the selected game pieces GP for use during play.

The addition of this game style allows competition of different game styles to be held. For example, the pool-type or own card-type game style information can be added to the competition registration information shown in FIG. 8 to hold the pool-type competition and the own card-type competition separately.

Figure 16:
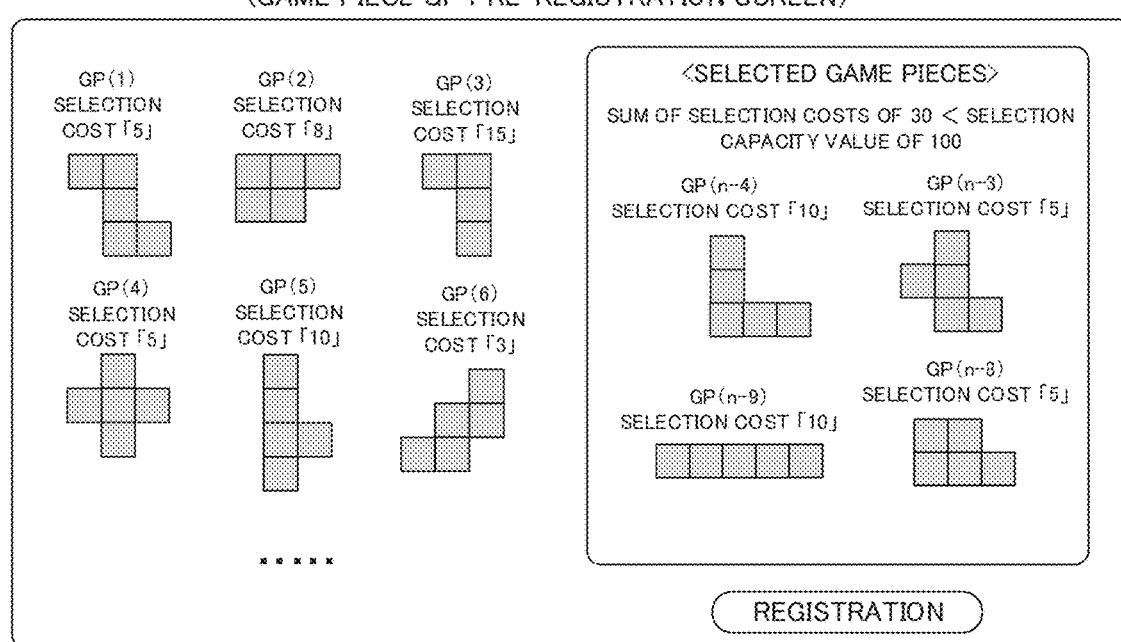
FIG. 16 A diagram for explaining another game style according to the present invention and showing an example of processing of pre-registering game pieces GP for use during play.

FIG. 16 is a diagram showing an example of pre-registration (deck registration) of game pieces GP for use during play. The game piece pre-registration processing is performed by the tournament management section 322 in the competition entry reception processing (S313, S111 in FIG. 6), for example. Specifically, in the example of FIG. 6, the own card-type competition holding is registered in the processing of producing the competition holding information at step S311, and the registration of own card-type competition holding information and the holding notification can be performed at step S312. For the own card-type competition, the game piece pre-registration processing can be performed during the competition entry reception processing at step S313.

In the example of FIG. 16, game pieces GP of different shapes can each have selection costs, and some of the game pieces GP can be registered such that and the sum of the selection costs thereof is equal to or lower than a predetermined selection capacity value. For example, the selection capacity value is 100, and a selection cost of 10, a selection cost of 15, a selection cost of 5, . . . , are preassigned to the game pieces GP. When a player selects the game piece GP(1), the selection cost "5" is subtracted from the selection capacity value. Each player can select a plurality of game pieces in an arbitrary combination as long as the sum of the selection costs of the selected game pieces is equal to or lower than the selection capacity value.

Control is performed such that at least one of the game pieces GP is selected. The maximum number of selectable game pieces GP is not limited as long as the sum of the selection costs is equal to or lower than the selection capacity value. Thus, only one game piece GP may be pre-registered. However, a player loses when he cannot place any game piece GP on the game board GF as described above, so that the player loses when he does not place any game piece GP even though there is still space to place a game piece GP. When the player pre-registers too small a number of game pieces GP, he may have no remaining game piece GP and lose even though there is still space to place a game piece GP on the game board GF. As a result, the player does not have a competitive advantage just because he selects a large number or a small number of game pieces GP. The point is which shapes and number of game pieces GP he selects, and this is his chance to show his skills.

The selection cost assigned to each game piece GP can depend on the usability (for example, the shape) of the game piece GP. For example, a game piece GP(6) in the example of FIG. 16 has a complicated shape and requires large space to place on the game board GF, which presents a higher level of difficulty in placement on the game board GF. On the other hand, a game piece GP(3) has a simple shape and does not require large space to place on the game board GF, which presents a lower level of difficulty in placement on the game board GF (easy to place). Thus, the game piece GP(3) has a selection cost set to be higher than that of the game piece GP(6). The selection cost assigned to the game piece GP can be set according to the usability in play (ease of placement on the game board GF).

The number of pre-registered game pieces GP can be the same or different among players. The selection cost can be changed as appropriate depending on the shape of the game board GF. Specifically, the usability of each game piece GP changes as the shape of the game board GF changes, so that the value of the selection cost can be changed depending on the shape of the game board. The number of game pieces to be used can also be changed depending on the shape of the game board GF. Specifically, more game pieces GP can be selectable by setting a higher selection capacity value for a game board GF having more squares and larger space, or more game pieces GP can be selectable by setting lower selection costs without changing the selection capacity value.

The tournament management section 322 links the plurality of game pieces GP selected in the game piece pre-registration as shown in FIG. 16 to the player ID and stores them. The tournament management section 322 may perform control to allow game piece pre-registration of a plurality of patterns. For example, the pre-registered game pieces can include a group of game pieces GP of a pattern A for use with a game board G(1) and a group of game pieces GP of a pattern B for use with a game board G(2). Such a configuration allows an own card-type competition in which players use different game boards as he wins matches. In addition, the tournament management section 322 may perform control to register groups of game pieces GP of a plurality of patterns for use with one game board GF. In this case, which pattern of the game pieces GP to use can be designated in advance, or one of the patterns can be selected during a match after the start of the competition.

Figure 17:
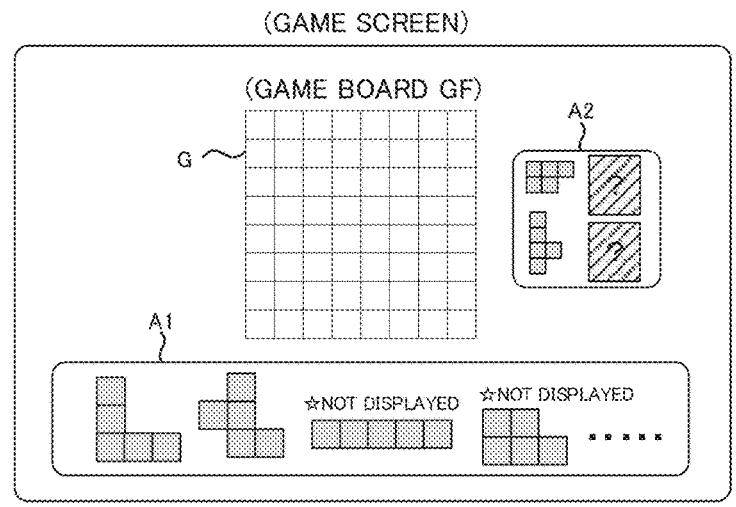
FIG. 17 A diagram showing an example of a game screen of the other game style according to the present invention.

FIG. 17 is a diagram showing an example of a game screen of the own card-type game style. As shown in FIG. 17, a group of pre-registered game pieces GP of one player are displayed in an own game piece display area A1, and the game board GF is placed above the game piece display area A1. A group of pre-registered game pieces GP of the other opponent player (opponent game piece display area A2) are displayed on the side of the game board GF. The opponent game piece display area A2 can be displayed in a predetermined reduced size.

The game pieces GP held by the player can be controlled not to be displayed on the game screen of the opponent player. For example, in the example of FIG. 17, two game pieces GP of the plurality of game pieces GP displayed on the opponent game piece display area A2 are controlled not to be displayed by masking each of them with a "?" mark. The number of the game pieces GP not to be displayed can be set arbitrarily, and the non-display setting can be performed in the game piece pre-registration processing. The display control for the own game piece display area A1 may be configured to perform certain display processing of indicating which game piece GP is not displayed to the opponent.

The functions of the present invention can be implemented by a program. A computer program previously provided for implementing each function can be stored on an auxiliary storage apparatus, the program stored on the auxiliary storage apparatus can be read by a control section such as a CPU to a main storage apparatus, and the program read to the main storage apparatus can be executed by the control section to allow a computer to perform the function of each component in the present invention. The functions of the present invention can also be provided by different apparatuses and those apparatuses can be connected directly or through a network to constitute the management apparatus 300.

The program may be recorded on a computer readable recording medium and provided for the computer. Examples of the computer readable recording medium include optical disks such as a CD-ROM, phase-change optical disks such as a DVD-ROM, magneto-optical disks such as a Magnet-Optical (MO) disk and Mini Disk (MD), magnetic disks such as a floppy Disk® and removable hard disk, and memory cards such as a compact Flash®, smart media, SD memory card, and memory stick. Hardware apparatuses such as an integrated circuit (such as an IC chip) designed and configured specifically for the purpose of the present invention are included in the recording medium.

DESCRIPTION OF THE REFERENCE NUMERALS 100, 100A, 100B USER APPARATUS
110 COMMUNICATION APPARATUS
120 CONTROL APPARATUS
121 GAME CONTROL SECTION
122 SPECTATING CONTROL SECTION
130 STORAGE APPARATUS
140 DISPLAY SECTION
150 OPERATION INPUT SECTION
300 MANAGEMENT APPARATUS (GAME MANAGEMENT APPARATUS)
310 COMMUNICATION APPARATUS
320 CONTROL APPARATUS
321 COMPETITION RUNNING CONTROL SECTION
322 TOURNAMENT MANAGEMENT SECTION
323 GAME MANAGEMENT SECTION
324 GAME LOG MANAGEMENT SECTION
325 SPECTATING CONTROL SECTION
326 SERVICE MANAGEMENT SECTION
330 STORAGE SECTION

The invention claimed is:
1. A management system for a network match puzzle game using portable user apparatuses each having a wireless communication capability, comprising:
  in the puzzle game in which competing players alternately put blocks respectively having different shapes in unoccupied space on a game board having a predetermined shape within a predetermined allotted time, a storage section configured to store competition schedule information including match start times of all matches of a tournament up to a final match, each of the match start times being calculated by using a game time per match based on a maximum turn number and the allotted time, the maximum turn number being set for each game board or for each shape and/or number of the blocks;

a tournament management section configured to provide the competition schedule information for each of the user apparatuses, to receive a competition entry request from each of the user apparatuses, and to set pairings in the tournament; and a game management section configured to connect to each of the user apparatuses to establish a game session, to simultaneously start control of games in the pairings at the match start times included in the competition schedule information, and to perform game control processing of obtaining placement information, including information about a block put on the game board and information about a position of the block, from one of the user apparatuses of the competing players, and transmitting the placement information from one of the user apparatuses of the competing players to another of the user apparatuses of the competing players which starts turn next, wherein the one of the user apparatuses of the competing players is configured to respectively add first authentication information and second authentication information, each being authenticated according to a predetermined authentication algorithm, to the information about the block put on the game board and the information about the position of the block in order to produce the placement information, and to transmit the placement information to the another of the user apparatuses of the competing players through the game management section, the game management section is configured to perform authentication processing using the first authentication information and the second authentication information based on the predetermined authentication algorithm when the placement information is transmitted from the one of the user apparatuses of the competing players to the another of the user apparatuses of the competing players, and to perform the game control processing when the placement information is properly authenticated, and the first authentication information and the second authentication information are created each time when data communication between the user apparatuses is performed.

2. The management system for the network match puzzle game according to claim 1, wherein the game management section is configured to perform:

game start processing of connecting the user apparatuses of the competing players in each of the pairings to establish a game session, and transmitting information about the game board and the blocks determined from the competition schedule information to each of the user apparatuses to start the game at the match start time.

3. The management system for the network match puzzle game according to claim 2, wherein the game control processing includes randomly producing an event occurrence trigger in transmitting the placement information of the one of the user apparatuses to the another of the user apparatuses which starts turn next and performing event processing on the blocks provided at the match start time.

4. The management system for the network match puzzle game according to claim 3, wherein the event processing is processing of adding a new block to the blocks provided at the match start time, processing of removing at least one block from the blocks provided at the match start time, or processing of replacing at least one block of the blocks provided at the match start time with another block having a different shape.

5. The management system for the network match puzzle game according to claim 2, wherein the game control processing includes processing of determining timeout notified through allotted time countdown processing performed in the user of apparatuses.

6. The management system for the network match puzzle game according to claim 1, further comprising a competition running control section configured to produce the competition schedule information, wherein the competition running control section is configured to allow setting of at least two different game boards in all matches of the tournament up to the final match and to produce the competition schedule information including the match start times of all matches up to the final match based on a first game time per match in a first game board of the game boards and a second game time per match in a second game board of the game boards different from the first game board, and the game management section is configured to set the game boards different from each other, based on the competition schedule information in all matches of the tournament up to the final match to control the games.

7. The management system for the network match puzzle game according to claim 1, further comprising:

a game log management section configured to receive, from each of the user apparatuses of the competing players, the information about the block put on the game board, to store the information received from each of the user apparatuses of the competing players on a time-series basis, to link a game log stored on the time-series basis to a search tag facilitating search by at least one of each competition, each game board, and each player, and to store the game log in the storage section; and a service management section configured to extract the game log searched for based on the search tag and to transmit the game log to each of the user apparatuses.

8. The management system for the network match puzzle game according to claim 1, wherein the tournament management section is configured to control registration of a plurality of different block groups used during play, for each player;

the game management section is configured to control display of a game screen including the game board on which the blocks are arranged, and to perform in the game screen to display so as to include a first display area displaying a group of blocks registered through the one of the user apparatuses and a second display area displaying a group of blocks registered through the another of the user apparatuses; and the game management section is configured to perform a non-display processing on some of the blocks of the block group registered through the another of the user apparatuses in the second display area.

9. The management system for the network match puzzle game according to claim 8, wherein the tournament management section is configured to control to be performed so that a block not to be displayed is selected in block group registration process; and, the game management section is configured to perform display processing indicating that the block is hidden from the first display area in the one of the user apparatuses, and to perform the non-display processing that masks the block selected by the another of the competing players as a target of non-display processing in the second display area.

10. The management system for the network match puzzle game according to claim 8, wherein the tournament management section is configured to register a plurality of block groups used during the play so that total selected cost value of selected blocks is within a predetermined selected capacity value based on selection cost set for each of the blocks having different shapes.

11. The management system for the network match puzzle game according to claim 1, wherein the predetermined authentication algorithm is created to be changed regularly.

12. A management apparatus for a network match puzzle game using portable user apparatuses each having a wireless communication capability, comprising:

in the puzzle game in which competing players alternately put blocks respectively having different shapes in unoccupied space on a game board having a predetermined shape within a predetermined allotted time, a storage section configured to store competition schedule information including match start times of all matches of a tournament up to a final match, each of the match start times being calculated by using a game time per match based on a maximum turn number and the allotted time, the maximum turn number being set for each game board or for each shape and/or number of the blocks;

a tournament management section configured to provide the competition schedule information for each of the user apparatuses, to receive a competition entry request from each of the user apparatuses, and to set pairings in the tournament; and a game management section configured to connect to each of the user apparatuses to establish a game session, to simultaneously start control of games in the pairings at the match start times included in the competition schedule information and to perform game control processing of obtaining placement information, including information about a block put on the game board and information about a position of the block, from one of the user apparatuses of the competing players, and transmitting the placement information from one of the user apparatuses of the competing players to another of the user apparatuses of the competing players which starts turn next, wherein the one of the user apparatuses of the competing players is configured to respectively add first authentication information and second authentication information, each being authenticated according to a predetermined authentication algorithm, to the information about the block put on the game board and the information about the position of the block in order to produce the placement information, and to transmit the placement information to the another of the user apparatuses of the competing players through the game management section, the game management section is configured to perform authentication processing using the first authentication information and the second authentication information based on the predetermined authentication algorithm when the placement information is transmitted from the one of the user apparatuses of the competing players to the another of the user apparatuses of the competing players, and to perform the game control processing when the placement information is properly authenticated, and the first authentication information and the second authentication information are created each time when data communication between the user apparatuses is performed.

13. A non-transitory tangible computer-readable storage media storing computer-executable instructions for causing a computer to perform game management processing for a network match puzzle game using portable user apparatuses each having a wireless communication capability, the instructions being configured to cause the computer to provide:

in the puzzle game in which competing players alternately put blocks respectively having different shapes in unoccupied space on a game board having a predetermined shape within a predetermined allotted time, a first function of storing competition schedule information including match start times of all matches of a tournament up to a final match, each of the match start times being calculated by using a game time per match based on a maximum turn number and the allotted time, the maximum turn number being set for each game board or for each shape and/or number of the blocks;

a second function of providing the competition schedule information for each of the user apparatuses, receiving a competition entry request from each of the user apparatuses, and setting pairings in the tournament; and a third function of connecting to each of the user apparatuses to establish a game session, simultaneously starting control of games in the pairings at the match start times included in the competition schedule information, and performing game control processing of obtaining placement information, including information about a block put on the game board and information about a position of the block, from one of the user apparatuses of the competing players, and transmitting the placement information from one of the user apparatuses of the competing players to another of the user apparatuses of the competing players which starts turn next, wherein the one of the user apparatuses of the competing players is configured to respectively add first authentication information and second authentication information, each being authenticated according to a predetermined authentication algorithm, to the information about the block put on the game board and the information about the position of the block in order to produce the placement information, and to transmit the placement information to the another of the user apparatuses of the competing players through the game management section, the third function performs authentication processing using the first authentication information and the second authentication information based on the predetermined authentication algorithm when the placement information is transmitted from the one of the user apparatuses of the competing players to the another of the user apparatuses of the competing players, and to perform the game control processing when the placement information is properly authenticated, and the first authentication information and the second authentication information are created each time when data communication between the user apparatuses is performed.

* * * * *